United States Patent

[11] 3,616,343

[72] Inventor Kiyoshi Inoue
 100 Sakato, Kawasaki, Kanagawa, Japan
[21] Appl. No. 475,375
[22] Filed July 28, 1965
[45] Patented Oct. 26, 1971
[32] Priority Aug. 8, 1964
[33] Japan
[31] 39/45157
 The portion of the term of the patent subsequent to Dec. 17, 1985, has been disclaimed.

[54] ELECTROCHEMICAL MACHINING METHOD
 13 Claims, 5 Drawing Figs.
[52] U.S. Cl. ................................................ 204/143 M,
 204/228, 204/224
[51] Int. Cl. ........................................... B23p 1/00
[50] Field of Search ........................................ 204/143, 224

[56] References Cited
 UNITED STATES PATENTS
 2,905,605  9/1959  Keeleric ................ 204/143
 2,974,215  3/1961  Inoue ..................... 219/68
 3,239,438  3/1966  Voorhees ............... 204/143
 3,372,099  3/1968  Clifford ................. 204/143
 3,417,006  12/1968 Inoue ..................... 204/143
 FOREIGN PATENTS
 971,462  9/1964  Great Britain ........... 204/143
 763,109  12/1956 Great Britain ........... 204/217
 OTHER REFERENCES
" Disintegrator Drilling," Steel, 2-21-44 pg. 92
Bleiweis et al., " Electrochemical Removal of Broken Tools," Metals and Alloys, pp. 1075- 1080, Nov. 1943
Keeleric et al., Report Submitted to Chairman of the Research Board Under Contract DA- 49- 025- AG83 Between Dept. of Defense and the Nat. Acad. of Sci., 1–1952

*Primary Examiner*—John H. Mack
*Assistant Examiner*—Sidney S. Kanfer
*Attorney*—Karl F. Ross CLAIM: 1. A process for the electrochemical machining of an electrochemically machinable conductive metallic workpiece comprising the steps of:
 spacedly juxtaposing said workpiece with an electrochemical-machining electrode having a supporting shank portion and a machining face portion to form a machining gap;

providing an aqueous-electrolyte coolant flow through said gap;

passing an electrical current across said gap;

providing relative movement between said electrode and said workpiece to machine electrolytically a cavity in said workpiece;

shielding the walls of said cavity proximate said shank portion of said electrode by forming in situ in the course of the electrolytic machining of said cavity a sheath of an electrically insulating material to limit further electrolytic action by introducing a substance into said electrolyte coolant capable of forming said sheath; and preventing formation of said insulating sheath on said workpiece proximate said machining face portion of said electrode by providing periodic spark discharge between said electrode machining face portion and said workpiece.

PATENTED OCT 26 1971 3,616,343

INVENTOR
KIYOSHI INOUE

BY *M T Murphy*
ATTORNEY

INVENTOR
KIYOSHI INOUE

ELECTROCHEMICAL MACHINING METHOD

My present invention relates to an electrochemical-machining apparatus and, more particularly, to an improved electrochemical-machining apparatus for shaping, drilling and removal of broken taps from a workpiece and for drilling operations therein.

In my application, Ser. No. 356,713, filed 2 Apr. 1964 (now U.S. Pat. No. 3,378,473), I disclose a method of machining conductive workpieces wherein a workpiece and an electrode are spacedly juxtaposed while an electrolyte is passed through the gap between them and an electrolytic-erosion current is passed between them to remove material from the workpiece. This current has a strong unidirectional or DC component and serves to bring the workpiece material in the region of the workpiece juxtaposed with the electrode into solution in the electrolyte.

While a system of this nature is effective for the sinking of dies, the machining of intricately shaped cavities and other material-removal operations, it is difficult to limit the lateral erosion of the workpiece when, for example, the system is employed for drilling a relatively small diameter hole. Moreover, the method heretofore provided for limiting lateral erosion, namely the shielding of the lateral portions of the electrode with nonconductive sheaths or layers, has proved to be cumbersome and time consuming. This disadvantage regarding lateral erosion of the workpiece is especially noted when the electrochemical machining system is employed for the removal of taps, drills and other relatively hard tools broken within a bore of the workpiece. Thus, electrochemical operations carried out in the bore of a workpiece with an electrode have sometimes resulted in an electrochemical erosion of the wall of the bore and, consequently, a widening thereof. It is well known that the removal of taps, drills and reamers from a cast or machined workpiece is carried out in order to salvage the workpiece. Methods which involve the widening of the hole, however, reduce the value of the recovered workpiece.

One of the objects of the present invention is to provide a method for the removal of a metallic element from the bore of a workpiece wherein the disadvantages of earlier methods are obviated. A more specific object of this invention is to provide a method of the character described whereby hardened tools or the like can be removed from relatively soft workpieces without a disadvantageous widening of the bore in which the tool or element is lodged.

An additional object of this invention is to provide an improved apparatus for the electrochemical drilling or boring and machining of a workpiece without causing deterioration of the latter.

A further object of this invention is to provide, in an apparatus of this type, an improved power circuit enabling the removal of binary hard compounds, such as the transition metal carbides used for tools and the like from a workpiece.

A further object of this invention is to provide an improved electrolyte composition for the electrochemical machining of an iron containing workpiece.

A still further object of this invention is to provide an improved method and apparatus for performing the alternate steps of electrochemical machining and electrical discharge machining.

These objects and others which will become apparent hereinafter are attained, in accordance with the present invention, in a method of extracting a metallic element from a bore of a workpiece. Thus, it is an important feature of the present invention that the metallic element is removed from the bore by juxtaposing it with an electrode and passing an electrolyte through the gap between the tool element and the workpiece while depositing from the electrolyte a coating agent adapted to form a barrier to electrolytic erosion along the lateral walls of the cavity. As a final step in the removal process, the particles remaining of the element are removed from the workpiece bore by mechanical means such as pressurized air blast and manual removal.

Still another feature of this invention resides in the provision of means for effecting spark discharge between the electrode and the workpiece in the region of closest approach for dislocating or disrupting any film adapted to impede electrolytic erosion in this region.

According to still another feature of the present invention, the power supply for applying the electrolytic erosion current across the gap includes means for periodically reversing the flow of current (e.g., an alternating-current source) in circuit with unbalancing means for reducing the amplitude of current pulses of one polarity to a value less than the current pulses of the opposite polarity. Thus, the main erosion current is carried out with relatively high amplitude pulses of one polarity while a periodic and relatively low amplitude pulse of the opposite polarity is applied between erosion pulses in order to facilitate the erosion of binary or intermetallic compounds having relatively electropositive and relatively electronegative atoms combined in the form of carbides or the like. It has been pointed out in my above-identified copending application that the periodic reversal of the polarity across the machining gap sharply increases the rate of erosion of such substances as tungsten carbide. I have further found that best results are obtained when the reverse current pulse is not of a more or less continuous character but is, instead, somewhat fluctuating within each reverse pulse period. The character of the reversed pulse, according to the present invention, is such that its amplitude is more or less periodically varied several times within each pulse period and preferably at a rate ranging between substantially 400 to 10,000 cycles per second. Advantageously, the power supply for producing the periodic current reversal includes a transformer having two branches of different impedances connected across the electrode workpiece gap with a common terminal. The different impedance levels can be provided by respective sections of a common secondary winding having a larger and smaller number of turns, separate secondary windings with a similar relationship of turns, or transformer coupling between the branches in aiding relationship with different resistive impedances in each line. Alternatively, each branch can be provided with a respective rectifier means in series with different effective resistances, the rectifier means being poled in an opposing relationship. The means for effecting an oscillation during the reverse-current period can include a high frequency alternating-current source period can include a high frequency alternating-current source whose amplitude may be equal to and is at most only slightly greater than the amplitude of the reverse current pulse which is applied across the gap by suitable means responsive to the decay of the main machining pulse.

The coating substance preferably is a compound which is introduced into the electrolyte in a highly soluble state and thus readily dissolves therein, but which is capable of forming an insoluble or slightly soluble composition in the region of the gap and the walls of the bore. Thus on the one hand, the electrolytic action taking place in the gap can be such as to transform the coating compound by electrolytic oxidation or reduction into an insoluble or slightly soluble substance which, as it is carried from the gap, coats the bore. On the other hand, the compound may be such as is capable of forming a slightly soluble or insoluble substance by combination with one or more of the ions found in the region of the gap. Thus, when the workpiece contains iron, the substance introduced into the electrolyte can be a compound capable of precipitating as an iron salt depositing upon the walls of the bore in a layer capable of limiting further electrolytic erosion. I have found that alkali phosphates, which are readily soluble in an aqueous electrolyte, tend to form iron salts at the gap as iron is eroded from the workpiece or element and dissolves in the electrolyte as the ferrous or ferric ion. The salt tends to coat the walls of the bore and is effective to limit erosion therealong. Other substances suitable for this purpose include the long-chain fatty acids which form relatively insoluble iron compounds and similar organic substances. It is preferred to use, for this purpose, stearic acid which forms an iron stearate alone or in conjunction with disodium phosphate, as mentioned above. Other compounds suitable for this purpose are benzoic acid, which forms ferric benzoate at the machining temperature, oleic acid, which forms ferric oleate. The long-chain fatty acids of the present invention should be those having in excess of eight carbon atoms in the chain and as many as twenty five. Advantageously, the electrolyte for the machining process contains 4–5 percent by weight of the fatty acid and between 5 and 10 percent by weight of the phosphate salt (e.g., $Na_2HPO_4$). Other additives include sulfuryl chloride ($SO_2Cl_2$, and sodium silicate ($Na_2SiO_3$). The latter compounds can be present in amounts ranging between 1 and 5 percent by weight. Acetylchloride can be used in amounts ranging between substantially 5 and 20 percent by weight as the ionizable salt provided for imparting conductance to the electrolyte. In general, however, the electrolyte should be a solution of sodium chloride (e.g., between substantially 5 and 30 percent by weight).

The invention as described and illustrated will be more readily apparent from the following description and specific examples, reference being made to the accompanying drawing in which.

Figure 1:
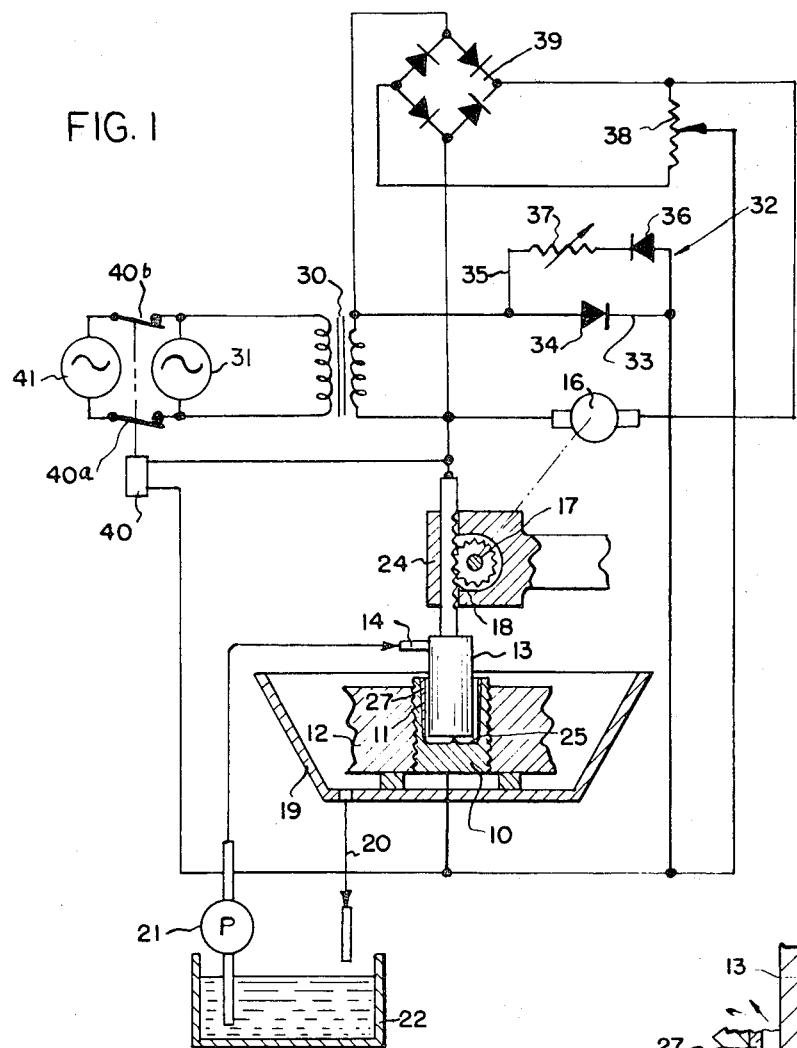
FIG. 1 is a somewhat diagrammatic elevational view, partly in section, of an apparatus embodying the present invention.
Figure 2:
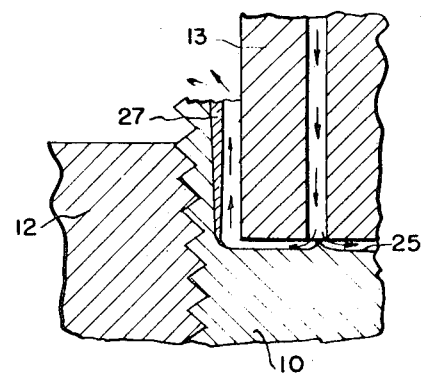
FIG. 2 is an enlarged detail view of the machining region.

Referring now to FIG. 1, it will be seen that the essential elements of a system for removing metallic elements, such as the tap 10 broken off within a bore 11 of a workpiece 12, consists of a tubular electrode 13 through the interior of which an electrolyte is fed via the inlet 14 and which is displaceable toward the workpiece via a servomotor 16 whose pinion gear 17 meshes with a rack 18. The workpiece 12 is disposed in a vessel 19 adapted to collect a depleted electrolyte and return it via line 20, preferably after filtering, to the reservoir 22 from which a pump 21 withdraws the electrolyte and passes it into the electrode 13 via the line 23. Electrode 13 has a machining face portion 26 and a supporting shank portion 28. The electrode 13 is carried by the head 24 of the apparatus which may be provided with orthogonal leadscrews for displacing the head in two mutually perpendicular horizontal directions for properly disposing the electrode 13 in alignment with the tap of metallic element 10 to be removed from the hole 11 of the workpiece 12. In a similar manner, vessel 19 together with the workpiece 12, or the latter independently of the vessel, can be displaced in two mutually perpendicular horizontal directions in the event the head 24 is fixed. From FIGS. 1 and 2 it can be seen that the electrode 13 forms a relatively narrow gap 25 between its machining face 26 and the juxtaposed surface of the metallic element 10 to be removed from the workpiece 12. As will be more apparent hereinafter, the electrolytic action between electrode 13 and element 10 gradually brings portions of the latter into solution and produces metal ions which combine with one or more compounds previously introduced in a highly soluble state into the electrolyte to yield relatively insoluble substances forming an electrically insulating layer 27 on the lateral walls of the hole formed in element 10 opposite the electrode shank portion 28 and of such character as to limit lateral erosion of that hole. The gap 25 is maintained slightly smaller than the annular gap between the lateral walls and the electrode by virtue of the downward movements of the electrode 13 by the servomotor or a constant speed motor 16. A motor of the latter type is employed when a number of metallic elements of a similar nature are to be extracted from a workpiece, since the rate of advance of the electrode will then be the same in each case. In order to prevent the buildup of the protective layer 27 along the face of the element 10 juxtaposed with the machining face 26 of electrode 13, spark discharge is periodically effected within this relatively narrow gap. The spark-discharge pressure and shock wave are sufficient to cause a mechanical dislocation and removal of the layer 27 in this narrow gap. At the same time, the spark discharges are further effective to remove material from the workpiece in the mode commonly known as electrical-discharge machining. It will be seen that the present invention provides a means for metal removal by alternately occurring and supplemental processes of electrochemical and electrical-discharge machining.

Figure 3:
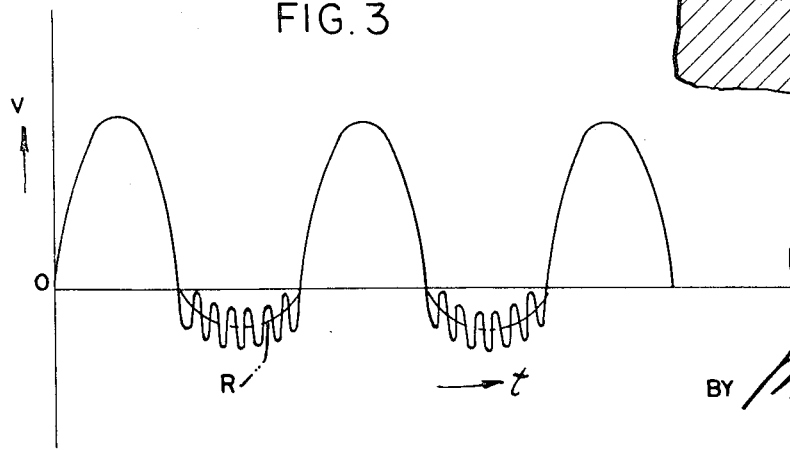
FIG. 3 is a voltage waveform of the electrical signal applied to the electrode.

The electrical supply circuit connected across the electrode 13 and the workpiece 12 includes a power transformer 30 whose primary is supplied with a relatively low frequency alternating-current by the AC source 31 and whose secondary winding is connected in series with the electrode 13 and the workpiece 12 via a two-branch rectifier network 32. The forwardly poled branch 33 of this network includes a rectifier diode 34 adapted to apply a positive potential to the workpiece 12 with low loss while substantially blocking reverse flow. If this rectifier alone were in circuit with the gap, the circuit or voltage applied to the machining device would be a pulsating DC as shown above the abscissa of FIG. 3. The rectifier 34 is, however, bridged by a high-impedance reverse-flow branch 35 whose forward impedance is less than the back impedance of branch 33. Such a branch may be formed by a rectifier 36 poled oppositely to rectifier 34 but connected in series with a variable resistor 37 which permits adjustment of the impedance of the reverse pulse and thus the magnitude of the reverse pulse. It is apparent, however, that rectifier 36 can be so chosen that its forward impedance is higher than that of rectifier 34, in which case the resistor 37 can be eliminated. With this arrangement, a low-voltage reverse pulse, as indicated by dot-dash line R in FIG. 3, will follow the main machining pulse. As noted in my above-identified-copending application, this reversal of current flow permits the removal of tool elements 10 composed of binary compounds having a highly electronegative element. Such compounds include tungsten carbides, alloys of tungsten carbide with cobalt and iron, titanium carbide and alloys thereof with cobalt as well as high-carbon tool steels and the like. The motor 16 is connected to one terminal of a voltage divider 38 and the ground terminal of the transformer 30. The full-wave rectifier 39, connected across the secondary winding of the transformer 30 energizes the voltage divider 38 whose tap is returned to a relay 40 whose other terminal is connected to the secondary winding of the transformer. The movable contacts 40a, 40b of the relay 40 are designed to disconnect a high-frequency alternating-current source 41 from the primary circuit of the transformer. The high-frequency generator 41 can have an output ranging between substantially 400 cycles per second to 10,000 cycles per second, as previously noted. It will be observed that during the positive pulses applied to the electrode 13 and the workpiece 12, the output from the voltage divider 38 acts in additive relationship with the positive pulse to energize the relay 40 and disconnect the high-frequency source 41. When, however, the negative pulse is applied, the relatively low level pulse acts in bucking or cancelling relationship with the low level output of the voltage divider 38 and deenergizes the relay 40 to close contacts 40a and b to apply the high-frequency source 41 at the input side of the transformer 30. The high-frequency potential imposed at the machining gap has a magnitude approximating the maximum magnitude of the reverse pulse R in FIG. 3 and produces a composite reverse wave, as shown in solid lines in FIG. 3.

Figure 4:
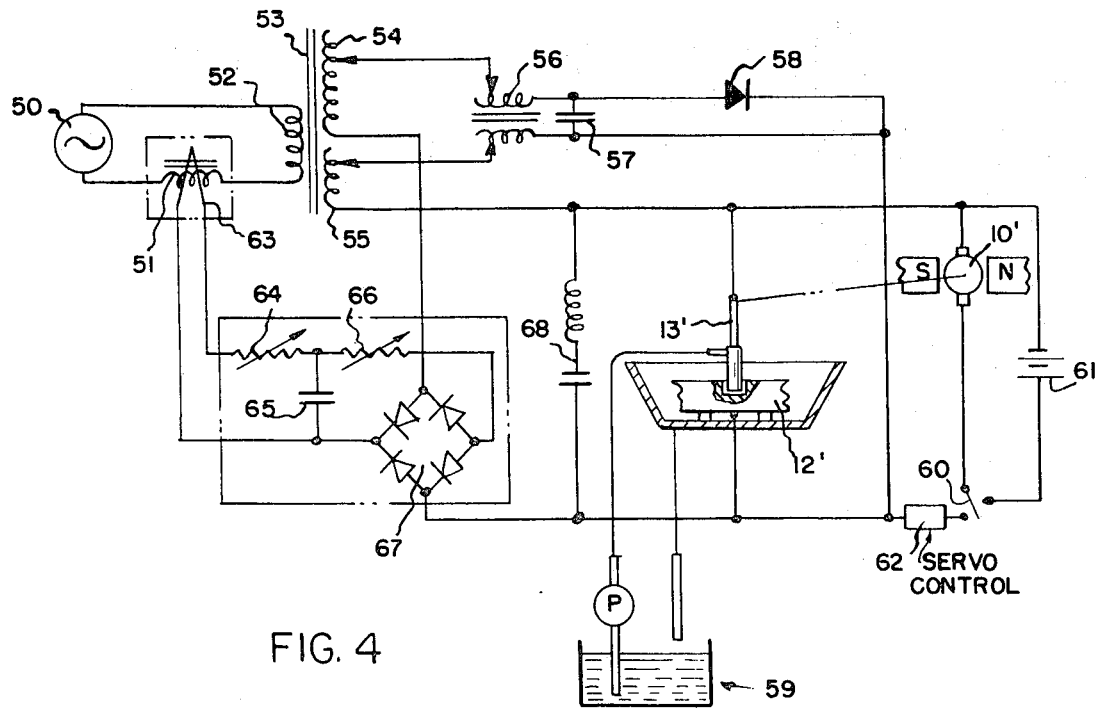
FIG. 4 is a circuit diagram and schematic showing of another drilling apparatus in accordance with this invention.

In FIG. 4, I show a modified arrangement for obtaining the periodic reversal described above. In this case, the AC source 50 is connected in series with a saturable-core reactor 51 and the primary winding 52 of a power transformer 53 having two secondary windings 54 and 55 defining respective branches of the supply circuit. As will be apparent, the adjustable tap of the secondary windings 54 and 55 is so positioned that a higher voltage is supplied at the winding 54 than at winding 55. The output sides of the secondary windings are passed through respective windings of a current transformer 56 in additive relationship, a capacitor 57 being connected across these windings while a rectifier 56 ensures blockage in one direction through one of the windings of the transformer 56. The output of this two-branch network is connected to the workpiece 12' and the electrode 13', as described above, a circulating system, generally designated 59, being employed to circulate electrolyte through the electrode. The motor 10' is here provided with selector switch 60 which permits it to be continuously driven by coupling across battery 61, thereby advancing the electrode 13' at a constant rate. The electrode displacing motor 10' can, in the other position of switch 60, be connected in circuit with a servocontrol 62, designed, as I have pointed out previously, to maintain a constant machining gap and adjusting the rate of advance of the motor and electrode accordingly. A feedback control of the power input is also provided in the form of saturable reactor 51 whose control winding 63 is connected in series with a variable resistor 64 across the capacitor 65 which can be charged through a further variable resistor 66 by the rectifier bridge 67 in accordance with the potential applied across the gap. It will be evident that the network 64 through 66 senses the potential over a predetermined time interval so that the feedback voltage is a function of the power applied at the gap. To cause breakdown of the film which may be formed at the machining face of the electrode, a resonant network 68 is connected across the gap in a discharge circuit adapted to effect the spark discharge previously mentioned. The transformer 56 and the rectifier 58 ensure that a forward flow of current through the secondary windings 54 and 55 will pass positive current pulses through the transformer 56 and rectifier 58 so that the potential applied between the electrode and the workpiece effectively constitutes the sum of the two potentials. During reverse current flow, however, the rectifier 58 blocks the high-voltage component so that only the low-voltage component is effectively employed.

Figure 5:
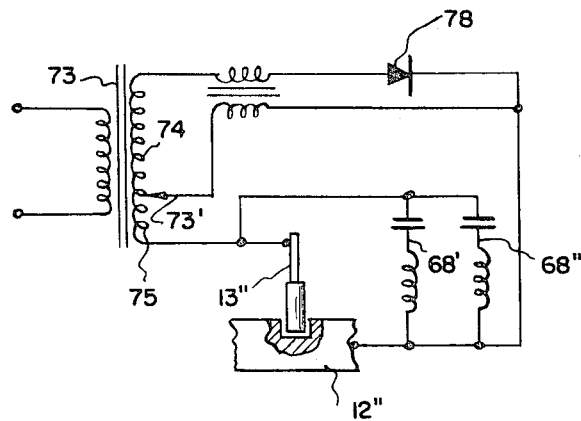
FIG. 5 is a view similar to FIG. 4 showing a simplified circuit arrangement.

A similar transformer 76 is shown in FIG. 5, one branch being in series with the rectifier 78. In this case, however, the transformer 73 is provided with a single secondary winding subdivided by a tap 73' into a first section 74 having a large number of turns and a second section 75 having a smaller number of turns. The electrode 13" and workpiece 12"', circulating system and other elements of the apparatus can be the same as those described in connection with FIGS. 1 and 2, it being understood that FIGS. 4 and 5 are merely variants of the overall apparatus and the resonant network 68 of FIG. 4 and the networks 68', 68" of FIG. 5 are illustrated to show how discharge can be applied across the gap in an effort to break down the film. Thus, it is understood that the high frequency source 41 of FIG. 1 is intended to be used with the circuit of FIGS. 4 and 5 as well, while the discharge networks of the latter figures are intended for use in FIG. 1 within the precepts of the present invention.

EXAMPLE

A tungsten carbide tap broken off in a bore of a high-carbon steel workpiece was extracted by electrochemical machining with the system illustrated generally in FIG. 1. The electrolyte consisted of 5 percent by weight stearic acid, 5 percent by weight disodium phosphate and 20 percent by weight sodium chloride in aqueous solution. The workpiece was S55C steel (0.55 percent carbon by weight) and the electrode had a diameter of 80 mm. i.e., somewhat less than the root diameter of the tap and a central electrolyte feeding bore whose diameter was 10 mm. The electrolyte was maintained at a temperature of 33° C and passed through the electrode at a velocity of 14 m. per second. The machining speed (tap extraction speed) was 2.4 mm. per minute and the maximum of increase in the diameter of the hole was found to be 0.2 mm. The hole was found to be coated with a layer along its lateral surfaces of iron stearate and iron phosphate. Effective results were obtained when a 40 percent solution of acetyl chloride was substituted for the 20 percent sodium chloride and between 1 and 5 percent by weight of sodium silicate was added to the electrolyte. A noticeable increase in the machining of tungsten carbide took place when a 2.5 kilocycles per second alternating current was superimposed during the reverse current flow over the main machining pulses applied at 100 cycles per second. The discharges successfully eliminated deposits from the machining area. The electrolyte pressure was 2.2 kg per cm.$^2$ at the gap and a copper electrode was employed. Results similar to those described above were obtained with a number of other hard metals.

I claim:

1. A process for the electrochemical machining of an electrochemically machinable conductive metallic workpiece comprising the steps of:
   spacedly juxtaposing said workpiece with an electrochemical-machining electrode having a supporting shank portion and a machining face portion to form a machining gap;
   providing an aqueous-electrolyte coolant flow through said gap;
   passing an electrical current across said gap;
   providing relative movement between said electrode and said workpiece to machine electrolytically a cavity in said workpiece;
   shielding the walls of said cavity proximate said shank portion of said electrode by forming in situ in the course of the electrolytic machining of said cavity a sheath of an electrically insulating material to limit further electrolytic action by introducing a substance into said electrolyte coolant capable of forming said sheath; and
   preventing formation of said insulating sheath on said workpiece proximate said machining face portion of said electrode by providing periodic spark discharge between said electrode machining face portion and said workpiece.

2. The process as defined in claim 1 wherein said insulating sheath is formed by a material soluble in said electrolyte but capable of deposition upon said cavity walls.

3. A process as defined in claim 1 wherein said sheath is formed by a first substance soluble in said electrolyte and insoluble in combination with a second substance electrolytically removed from said workpiece.

4. A process as defined in claim 3 in which said substance soluble in said electrolyte comprises an alkali phosphate and said substance removed from said workpiece comprises iron, 5. A process as set forth in claim 3 wherein said first substance comprises a long chain fatty acid and said second substance comprises iron.

6. A process for the electrochemical machining of a conductive electrochemically erodable workpiece comprising the steps of:
   spacedly juxtaposing said workpiece with an electrochemical-machining electrode having a supporting shank portion and a machining face portion to form a machinery gap;
   providing an electrochemical-machining electrolyte coolant flow through said gap;
   passing an electrical current across said gap to machine a cavity in said workpiece proximate said machining face portion of said electrode;
   maintaining a substantially constant gap between said machining face and said workpiece, said gap having a spacing less than the clearance between said shank portion and the walls of said cavity;
   applying an electrically insulating sheath to said cavity walls proximate said shank portion during the course of electrochemical erosion of said workpiece by introducing a substance into said electrolyte coolant capable of forming said sheath; and
   preventing formation of said insulating sheath on said workpiece proximate said machining face portion of said electrode by providing periodic spark discharge between said electrode machining face portion and said workpiece.

7. A process for the electrochemical machining of a conductive workpiece spaced from a tool electrode by a machining gap in the presence of an electrolyte coolant comprising the steps of passing a plurality of relatively low frequency electrical pulses of one polarity and of relatively large amplitude across said gap, each of said pulses spaced from the others by a pulse of opposite polarity and of relatively low amplitude, providing relative movement between said electrode and workpiece to maintain said machining gap substantially constant to machine cavity in said workpiece and applying an electrically insulating sheath to said cavity to control its size by introducing a substance into said electrolyte coolant capable of forming said sheath and applying an electrical discharge.

8. The combination as set forth in claim 7 further comprising the steps of:
periodically varying the amplitude of each of the aforesaid relatively low amplitude pulses at a substantially higher frequency, said first-mentioned pulses having a frequency of substantially 40 to 100 cycles per second; and
periodically varying the amplitude of each of said low amplitude pulses at a frequency of substantially 400 to 10,000 cycles per second.

9. A process for the electrochemical machining of an electrochemically machinable conductive workpiece comprising the steps of:
spacedly juxtaposing said workpiece with an electrochemical-machining electrode having a supporting shank portion and a machining face portion to form a machining gap;
providing an electrochemical-machining electrolyte coolant flow into said gap proximate said machining face portion and from said gap proximate said shank portion;
passing an electrical current across said gap;
maintaining a predetermined gap spacing between said electrode and workpiece to machine a cavity in said workpiece proximate said machining face portion of said electrode; and
forming an electrically insulating sheath intermediate said shank portion and the walls of said cavity walls in contact with said electrolyte except portions thereof with said gap spacing from said tool electrode by introducing a substance into said electrolyte coolant capable of forming said sheath and applying an electrical discharge at said portions.

10. A process for the electrochemical machining of a conductive workpiece comprising the steps of spacedly juxtaposing said workpiece with an electrode having a supporting shank portion and a machining face portion to form a machining gap, providing an electrolyte coolant flow into said gap proximate said machining face portion and from said gap proximate said shank portion, passing an electrical current across said gap to machine a cavity in said workpiece proximate said machining face portion of said electrode, maintaining a predetermined gap spacing between said electrode and workpiece, forming in situ an electrically insulating sheath intermediate said shank portion and the walls of said cavity proximate thereto, and initiating periodic electrical discharges intermediate said machining face portion and said cavity to inhibit formation of said sheath proximate thereto.

11. A process for the electrochemical machining of a conductive workpiece comprising the steps of spacedly juxtaposing said workpiece with an electrode having a supporting shank portion and a machining face portion to form a machining gap, providing an electrolyte coolant flow into said gap proximate said machining face portion and from said gap proximate said shank portion, passing an electrical current across said gap to machine electrolytically a cavity in said workpiece proximate said machining face portion of said electrode, maintaining a predetermined gap spacing between said electrode and workpiece, and admixing a substance in said electrolyte coolant for inhibiting electrolytic action intermediate said shank portion and portions of said cavity proximate thereto while generating an electrical discharge at said portion.

12. A process for the electrical machining of a conductive workpiece comprising the steps of spacedly juxtaposing said workpiece with an electrode having a machining face portion for a machining gap, providing a coolant flow into said gap proximate said machining face portion, passing an electric current across said gap, and alternately depositing an electrical insulating film on said workpiece from said coolant proximate said machining face portion and removing said film and portions of said workpiece by initiating periodic electrical discharge across said gap.

13. A process for the electrical machining of a conductive workpiece comprising the steps of spacedly juxtaposing said workpiece with an electrode having a machining face portion to form a machining gap, providing a coolant flow into said gap through said electrode, passing an electrical current across said gap, and alternately depositing an electrical insulating film on said workpiece from said coolant proximate said machining face portion and initiating periodic electrical discharge across said gap to remove said film and to remove portions of said workpiece.

* * * * *